United States Patent
Mitchell et al.

(10) Patent No.: US 12,200,099 B2
(45) Date of Patent: *Jan. 14, 2025

(54) MULTI-PARTY CRYPTOGRAPHIC SYSTEMS AND METHODS

(71) Applicant: Intertrust Technologies Corporation, Berkeley, CA (US)

(72) Inventors: Stephen G. Mitchell, Ben Lomond, CA (US); Vanishree Rao, San Mateo, CA (US)

(73) Assignee: Intertrust Technologies Corporation, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/386,214

(22) Filed: Nov. 1, 2023

(65) Prior Publication Data

US 2024/0063999 A1 Feb. 22, 2024

Related U.S. Application Data

(63) Continuation of application No. 17/004,610, filed on Aug. 27, 2020, now Pat. No. 11,843,686.

(Continued)

(51) Int. Cl.
*H04L 9/00* (2022.01)
*H04L 9/08* (2006.01)

(52) U.S. Cl.
CPC .............. *H04L 9/006* (2013.01); *H04L 9/008* (2013.01); *H04L 9/0825* (2013.01); *H04L 9/0866* (2013.01); *H04L 2209/20* (2013.01)

(58) Field of Classification Search
CPC ....... H04L 9/006; H04L 9/008; H04L 9/0825; H04L 9/0866; H04L 2209/20

(Continued)

(56) References Cited

U.S. PATENT DOCUMENTS

| 7,257,844 B2 | 8/2007 | Woodward |
| 9,077,539 B2 | 7/2015 | Kamara et al. |

(Continued)

FOREIGN PATENT DOCUMENTS

| EP | 1372055 | 12/2003 |
| EP | 3334083 | 6/2018 |

OTHER PUBLICATIONS

Secure Multiparty Computation (MPC). Yehuda Lindell. IACR Cryptol. ePrint Arch. vol. 2020. Published May 11, 2020, (15 pgs).

(Continued)

*Primary Examiner* — Moeen Khan
(74) *Attorney, Agent, or Firm* — John P. Davis; Thayne and Davis LLC (57) ABSTRACT

This disclosure relates to systems and methods for performing cryptographic operations in connection with the management of electronic content using multiple license services. In some circumstances, a content service may not wish to share unencrypted content keys with a single license service for a variety of security reasons. Embodiments of the disclosed systems and methods may use multi-party cryptographic methods in connection with the management of protected content keys and/or associated licenses and/or the distribution of content keys and/or licenses to authorized users and/or devices. In various embodiments, a content service may split a content key into a plurality of key shares and may transmit the key shares to a plurality of different license services. The license services may coordinate operations to generate a protected content key without revealing unencrypted content key to any of the participating license services.

18 Claims, 7 Drawing Sheets

Related U.S. Application Data (60) Provisional application No. 62/892,357, filed on Aug. 27, 2019.

(58) Field of Classification Search
USPC .......................................................... 726/26
See application file for complete search history.

(56) References Cited

U.S. PATENT DOCUMENTS

| | | | |
|---|---|---|---|
| 9,350,539 | B2 | 5/2016 | Veugen et al. |
| 9,660,805 | B2 | 5/2017 | Parann-Nissany et al. |
| 9,673,975 | B1 | 6/2017 | Machani |
| 9,794,232 | B2 | 10/2017 | Shaw |
| 9,954,680 | B1 | 4/2018 | Machani et al. |
| 10,511,436 | B1 | 12/2019 | Machani |
| 10,547,444 | B2 | 1/2020 | Harris et al. |
| 11,238,140 | B2 | 2/2022 | Dean et al. |
| 2008/0056501 | A1* | 3/2008 | McGough ............... H04L 63/08 380/282 |
| 2010/0208889 | A1 | 8/2010 | Humphrey |
| 2016/0140545 | A1* | 5/2016 | Flurscheim et al. |
| 2020/0076594 | A1 | 3/2020 | Audley |
| 2020/0112429 | A1* | 4/2020 | Keselman ............. H04L 9/0861 |

OTHER PUBLICATIONS

From Keys to Databases—Real-World Applications of Secure Multi-Party Computation. Archer et al. The Computer Journal, vol. 61, Issue 12, pp. 1749-1771. Published Sep. 12, 2018 (32 pgs).

High-Throughput Semi-Honest Secure Three-Party Computation with an Honest Majority. Araki et al. CCS '16: Proceedings of the 2016 ACM SIGSAC Conference on Computer and Communications Security, pp. 805-817. Published Oct. 26, 2016 (13 pgs).

Fast Secure Multiparty ECDSA with Practical Distributed Key Generation and Applications to Cryptocurrency Custody. Lindell et al. IACR Cryptol. ePrint Arch. Vol. 2018. Published Oct. 14, 2018 (50 pgs).

Dec. 1, 2020 International Search Report, PCT/US2020/048199. (5 pgs).

Dec. 1, 2020 Written Opinion of the International Search Authority, PCT/US2020/048199. (8 pgs).

Official Communication Pursuant to Rules 161(1) and 162 EPC from the European Patent Office. EP Application No. 20775973.9-1218.

Communciation Pursuant to Article 94(3) EPC from the European Patent Office, EP Application No. 20775973.9—2018.

* cited by examiner

MULTI-PARTY CRYPTOGRAPHIC SYSTEMS AND METHODS

RELATED APPLICATION

This application is a continuation of U.S. application Ser. No. 17/004,610, filed Aug. 27, 2020, and entitled "MULTI-PARTY CRYPTOGRAPHIC SYSTEMS AND METHODS," which claims the benefit of priority under 35 U.S.C. § 119(e) to U.S. Provisional Application No. 62/892,357, filed Aug. 27, 2019, and entitled "MULTI-PARTY CRYPTOGRAPHIC SYSTEMS AND METHODS," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to cryptographic systems and methods. More specifically, but not exclusively, the present disclosure relates to systems and methods for performing cryptographic operations involving multiple parties.

Media license generation and delivery and/or key distribution protocols are often used connection with the secure distribution and management of protected content. For example, content may be protected through encryption that requires a device to possess a content key used to the decrypt protected content prior to rendering the content. Access to content may thus be managed by controlling the generation and/or distribution of licenses and/or content keys to devices.

Content services may generate and distribute content keys and/or licenses associated with protected content. In some content management architectures, a content service may use a separate license service to manage the distribution of content keys and/or licenses to authorized users and/or associated devices. For example, a content service may generate a content key and encrypt content using the content key. The content service may share this content key with a license service, which may manage the distribution of the content key and/or associated licenses to authorized users and their devices.

In some circumstances, a content service may not wish to share content keys in an unencrypted and/or otherwise cleartext form with a license service for a variety of security reasons. The content service, however, may still wish to use a separate license service in connection with the management and/or distribution of content keys to authorized users and/or devices.

Embodiments of the disclosed systems and methods may use multi-party cryptographic methods in connection with the management of protected content keys and/or associated licenses and/or the distribution of content keys and/or licenses to authorized users and/or devices. In some embodiments, the disclosed systems and methods may allow for the management and distribution of content keys and/or associated licenses to authorized users and/or devices using multiple license services without the content keys being revealed in the clear and/or in an otherwise unencrypted form to the license services. Although various embodiments are described herein as generating protected content keys (which may be included in some embodiments in an associated content license) for use in decrypting a protected electronic content item, it will be appreciated that an electronic content item as used herein may comprise any type of content, information, data, and/or payload that may be protected using keyed encryption.

In certain embodiments, a content service may split a generated content key into a plurality of "shares" of the content key. The content key shares may be sent by the content service to separate license services. For example, the content service may send a first key share—$k_1$—of a content key k to a first license service. Similarly, the content service may send a second key share—$k_2$—of the content key k to a second license service. The first and second key shares may be generated in a manner such that knowledge of either the first key share or the second key share alone does not reveal the unencrypted content key k (e.g., reveal the unencrypted content key to the license services).

Consistent with embodiments described herein, the first license service may encrypt the first key share using a device public key—n—associated with an authorized user and/or device. The first license service may send the encrypted first key share—denoted as $[k_1]_n$ indicating key share $k_1$ encrypted with the device public key n—to the second license service. Using a suitable multi-party computation ("MPC") technique, the second license service may generate a protected content key $[k]_n$ using, at least in part, the encrypted first key share received from the first license service, the second key share received from the content service, and the device public key associated with the authorized user and/or device. The protected content key may comprise the content key k encrypted with the device public key n associated with the authorized user and/or device. The protected content key may be sent to the authorized user and/or device by the second license service for use in connection with accessing, using, and/or rendering protected content (e.g., sent as part of a content license and/or the like).

The generation of the protected content key $[k]_n$ using MPC techniques consistent with various embodiments disclosed herein may be performed by the second license service without revealing the unencrypted first content key share and/or the unprotected content key to the second license service. In this manner, the content service may be assured that the unprotected content key is not shared in an unencrypted and/or otherwise cleartext form with either the first license service or the second license service.

In certain embodiments, a method for managing an electronic content item may include receiving a public key from a device at a first license service. In some embodiments, the public key may be associated with the device, a user of the device, and/or another associated principal.

A first content key share of a content key may be received from a content service managing the electronic content item. In some embodiments, the first content key share may be generated by the content service. The first content key share may comprise a padded key share. The content key may comprise a content decryption key associated with the electronic content item and, in certain embodiments, be generated by the content service.

A protected second content key share of the content key may be received from a second license service that may be separate from the first license service. The protected second content key share may comprise a second content key share of the content key encrypted by the second license service using the public key (e.g., encrypted using a homomorphic encryption algorithm). In certain embodiments, the second content key share may be generated by the content service. In some embodiments, the second content key share may comprise a protected padded content key share.

A protected first content key share of the content key may be generated by the first license service by encrypting the first content key share using the public key (e.g., using the homomorphic encryption algorithm used to generate the protected second content key share).

The protected first content key share and the protected second content key share may be used to generate a protected content key. In certain embodiments, the protected content key may comprise the content key encrypted with the public key using a homomorphic encryption algorithm. In some embodiments, the protected content key may be generated by multiplying the protected first content key share and the protected second content key share. When the protected first content key share and the protected second content key share comprise padded key shares, the generated protected content key may comprise a protected padded content key.

The protected first content key share may be transmitted to the device for use in accessing the electronic content item. In some embodiments, various aspects of the disclosed methods may be performed in response to receiving a request for a license to access the electronic content item. In response to such a request, a license may be generated that includes the protected first content key. The license may be transmitted to the device from the first license service.

BRIEF DESCRIPTION OF THE DRAWINGS

The inventive body of work will be readily understood by referring to the following detailed description in conjunction with the accompanying drawings, in which.

DETAILED DESCRIPTION OF THE DRAWINGS

A description of the systems and methods consistent with embodiments of the present disclosure is provided below.

While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods may use multi-party cryptographic methods in connection with the management of protected content keys and/or associated licenses. Some embodiments described herein may allow for a content service to use multiple license services without revealing secret content keys to a single license service in the clear and/or in an otherwise unencrypted form.

In certain embodiments, a content service may split a generated content key into a plurality of "shares" of the content key. The content key shares may be sent by the content service to separate license services. As described in more detail below, the license serves may engage in an MPC to generate a protected version of the content key that, in some embodiments, may comprise an encrypted content key (e.g., encrypted with a public key of a rendering device). In some embodiments, the MPC may proceed in a manner that does not reveal the content key in the clear and/or in an otherwise unencrypted form to the license services.

In some embodiments, a homomorphic cipher may be used in connection with generating the protected content key. For example and without limitation, in some embodiments, a homomorphic public key cryptosystem such as Rivest-Shamir-Adleman ("RSA") may be used. Content key shares may be encrypted by the license services using a device public key shared with the license service. Using the homomorphic property of the encryption cipher and the encrypted content key shares, a protected content key (e.g., the content key encrypted with the device public key) may be generated by at least one of the license services without revealing the unprotected cleartext content key to the license services.

Although various embodiments are described herein in connection with cryptographic MPCs used to generate protected content keys and/or associated content licenses, it will be appreciated that the disclosed embodiments and/or aspects thereof may be further used in connection with a variety of other applications and/or contexts.

Figure 1:
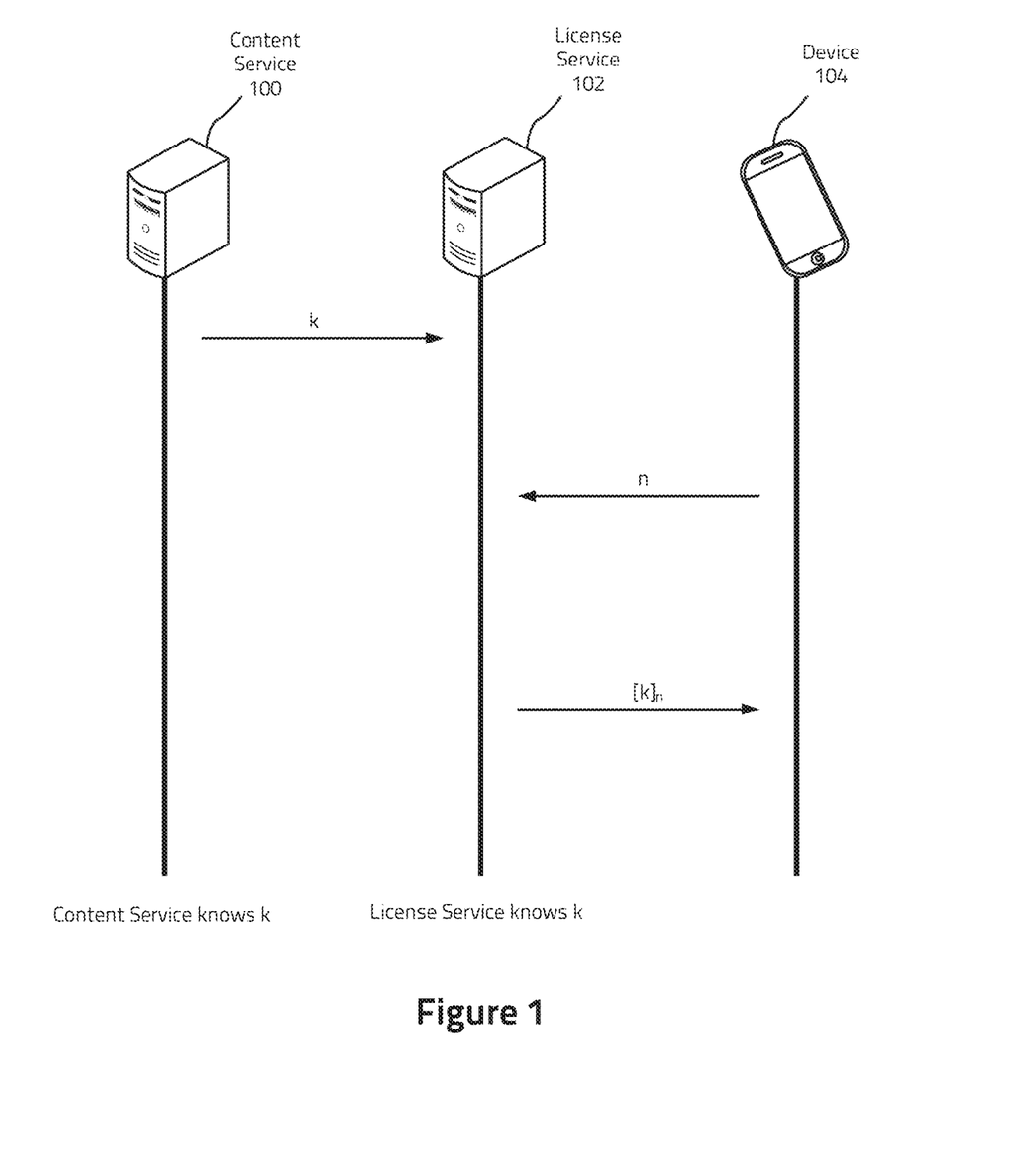
FIG. 1 illustrates an example of a content key distribution protocol involving a content service, a license service, and a rendering device consistent with certain embodiments disclosed herein.

FIG. 1 illustrates an example of a content key distribution protocol involving a content service 100, a license service 102, and a rendering device 104 consistent with certain embodiments disclosed herein. The content service 100, license service 102, and/or rendering device 104 may be communicatively coupled via one or more communication channels that, in some embodiments, may comprise secure communication channels.

The content service 100, license service 102, and/or rendering device 104 shown in connection with FIG. 1 (and/or other content services, license services, and/or rendering devices shown in connection with other figures and/or described elsewhere herein) may comprise any suitable computing system or combination of systems configured to implement embodiments of the systems and methods disclosed herein. In certain embodiments, the content service 100, license service 102, rendering device 104, and/or one or more other systems or services may comprise at least one processor system configured to execute instructions stored on an associated non-transitory computer-readable storage medium. As discussed in more detail below, the content service 100, license service 102, and/or rendering device 104, and/or one or more other systems or services may further comprise a secure processing unit ("SPU") and/or a trusted execution environment ("TEE") configured to perform sensitive operations such as trusted credential and/or key management, secure policy and/or condition management, and/or other aspects of the systems and methods disclosed herein. The content service 100, license service 102, and/or rendering device 104, and/or one or more other systems or services may further comprise software and/or hardware configured to enable electronic communication of information between the systems, services, and/or devices 100-104 via one or more associated network connections.

The content service 100, license service 102, rendering device 104, and/or one or more other systems or services may comprise one or more computing devices executing one or more applications configured to implement embodiments of the systems and methods disclosed herein. In certain embodiments, the content service 100, license service 102, and/or rendering device 104 may comprise at least one of a smartphone, a smartwatch, a laptop computer system, a desktop computer system, a tablet computer, a server computer system, and/or any other computing system and/or device that may be used in connection with the disclosed systems and methods. In certain embodiments, the content service 100, license service 102, and/or the rendering device 104 may comprise software and/or hardware configured to, among other things, generate content keys associated with protected content and/or associated content key shares, communicate keys and/or other information (e.g., key shares) for use in connection with generating protected content keys and/or licenses, perform encryption operations, engage and/or otherwise coordinate MPCs in connection with generating protected content keys and/or licenses, and/or perform other aspects of the disclosed embodiments.

The content service 100, license service 102, and/or the rendering device 104 may communicate using a network comprising any suitable number of networks and/or network connections. The network connections may comprise a variety of network communication devices and/or channels and may use any suitable communication protocols and/or standards facilitating communication between the connected devices and systems. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

In some embodiments, the content service 100 may comprise a service that generates content. In further embodiments, the content service 100 may comprise a content distribution service configured to securely manage the distribution of content generated by other services and/or systems to authorized users and/or devices and/or coordinate protected content key and/or license distribution with one or more license services (e.g., license service 102).

In some embodiments, the content service 100 may generate a content key k associated with protected electronic content. In some embodiments, the content key may comprise a key that may be used to decrypt the protected electronic content. In certain embodiments, the protected electronic content may be encrypted using the content key and/or another related key. In some embodiments, the content key may be used to directly decrypt the protected electronic content. In further embodiments, the content key may be used to generate another key that may be used to decrypt the protected electronic content.

The content service 100 may share the generated content key k with the license service 102. Consistent with embodiments disclosed herein, the license service 102 may generate a protected content key and/or an associated license using the content key k. For example, in some embodiments, a device 104 and/or associated user that is authorized to access, use, and/or otherwise render the electronic content may share a device public key—n—with the license service 102. In some embodiments, the device public key may comprise a public key used in connection with an asymmetric cryptographic protocol such as, for example and without limitation, RSA and/or other associated protocols.

Although various embodiments disclosed herein may use the notation n to refer to a public key for explanation purposes, it will be appreciated that in certain asymmetric cryptographic protocols, including RSA, a public key may comprise integer values associated with the modulus n and the public and/or encryption exponent e. In addition, although various embodiments described herein may use a device public key n in connection with various aspects of the disclosed embodiments, it will be appreciated a variety of other types of public keys may be used including, for example and without limitation, a public key associated with a user and/or another principal.

The license service 102 may encrypt the content key k using the device public key n to generate a protected content key $[k]_n$. In some embodiments, the license service 102 may include the protected content key in a license associated with the protected content. The protected content key and/or an associated license may be distributed to the authorized device 104 and/or an associated user for use in connection with accessing, using, and/or otherwise rendering the protected electronic content. For example, in some embodiments, the device 104 may decrypt the protected content key using a private device decryption key corresponding to its public encryption key n and use the decrypted content key to decrypt protected electronic content for access, use, and/or rendering by the device 104.

In the protocol shown in FIG. 1, the license service 102 may receive the unprotected content key k from the content service 100. As discussed above, however, a content service may not wish to share content keys in the clear and/or in an otherwise unencrypted form for a variety of security reasons. Accordingly, multi-party cryptographic methods consistent with aspects of the disclosed embodiments may be used in connection with the management of protected content keys and/or associated licenses and/or the distribution of content keys and/or licenses to authorized users and/or devices.

Figure 2:
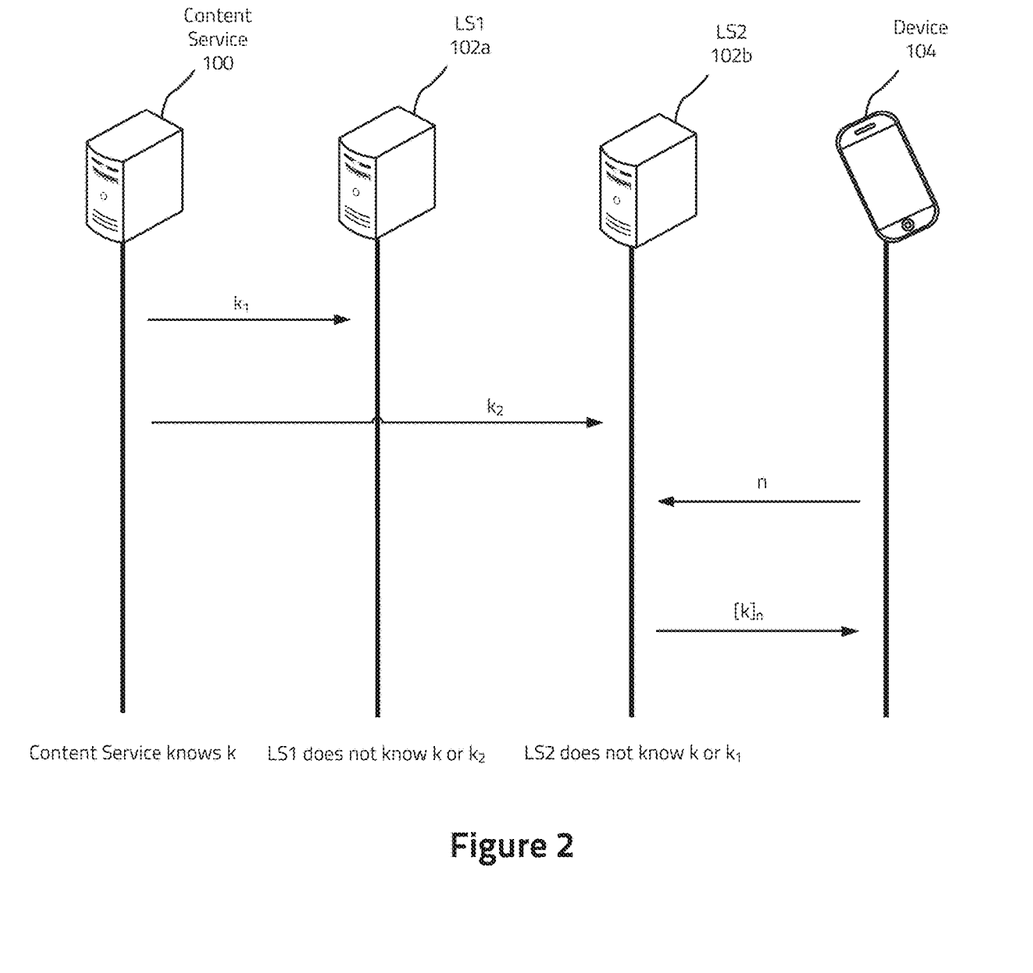
FIG. 2 illustrates a simplified example of a content key distribution protocol involving a content service, multiple license services, and a rendering device consistent with certain embodiments disclosed herein.

FIG. 2 illustrates a simplified example of a content key distribution protocol involving a content service 100, multiple license services LS1 102*a* and LS2 102*b*, and a rendering device 104 consistent with certain embodiments disclosed herein. Consistent with embodiments disclosed herein, the content service 100 may split a content key into multiple shares and may communicate the generated shares to different license services 102*a*, 102*b*. For example, as illustrated, the content service 100 may send a first key share—$k_1$—of a content key k to a first license service 102*a* and a second key share—$k_2$—of the content key k to a second license service 102*b*. In various embodiments, the first and second key shares may be generated in a manner such that knowledge of either the first key share or the second key share alone does not reveal the unencrypted content key k (e.g., reveal the unencrypted content key to the license services 102*a*, 102*b*).

Using the received key shares $k_1$ and $k_2$ and the device public key n the license services 102*a*, and 102*b* may engage in a cryptographic MPC protocol, described in more detail below in connection with FIG. 3, to generate a protected content key $[k]_n$. Consistent with embodiments disclosed herein, the generation of the protected content key $[k]_n$ may be performed by the license services 102*a*, 102*b* without revealing the cleartext and/or otherwise unencrypted key shares with each other and/or the unprotected content key. In this manner, the content service 100 may be assured that the unprotected content key is not shared in an unencrypted and/or otherwise cleartext form with either the first license service 102*a* or the second license service 102*b*.

Although various examples described herein, including the examples illustrated in connection FIG. 2, use two license services LS1 102*a* and LS2 102*b* and two-party cryptographic MPC protocols, it will be appreciated that any suitable number of license services and/or associated participants in a cryptographic MPC protocol may be used in connection with the disclosed embodiments. For example and without limitation, a content service may generate three content key shares and may employ three license services engaging in a three-party cryptographic MPC protocol to generate a protected content key and/or associated license for distribution to a device and/or an authorized user. In this manner, it will be appreciated that a number of variations can be made to the architecture, relationships, and examples presented in connection with the figures and/or described herein within the scope of the inventive body of work. Thus it will be appreciated that the architecture, relationships, and examples presented in connection with the various figures and/or associated description are provided for purposes of illustration and explanation, and not limitation.

Figure 3:
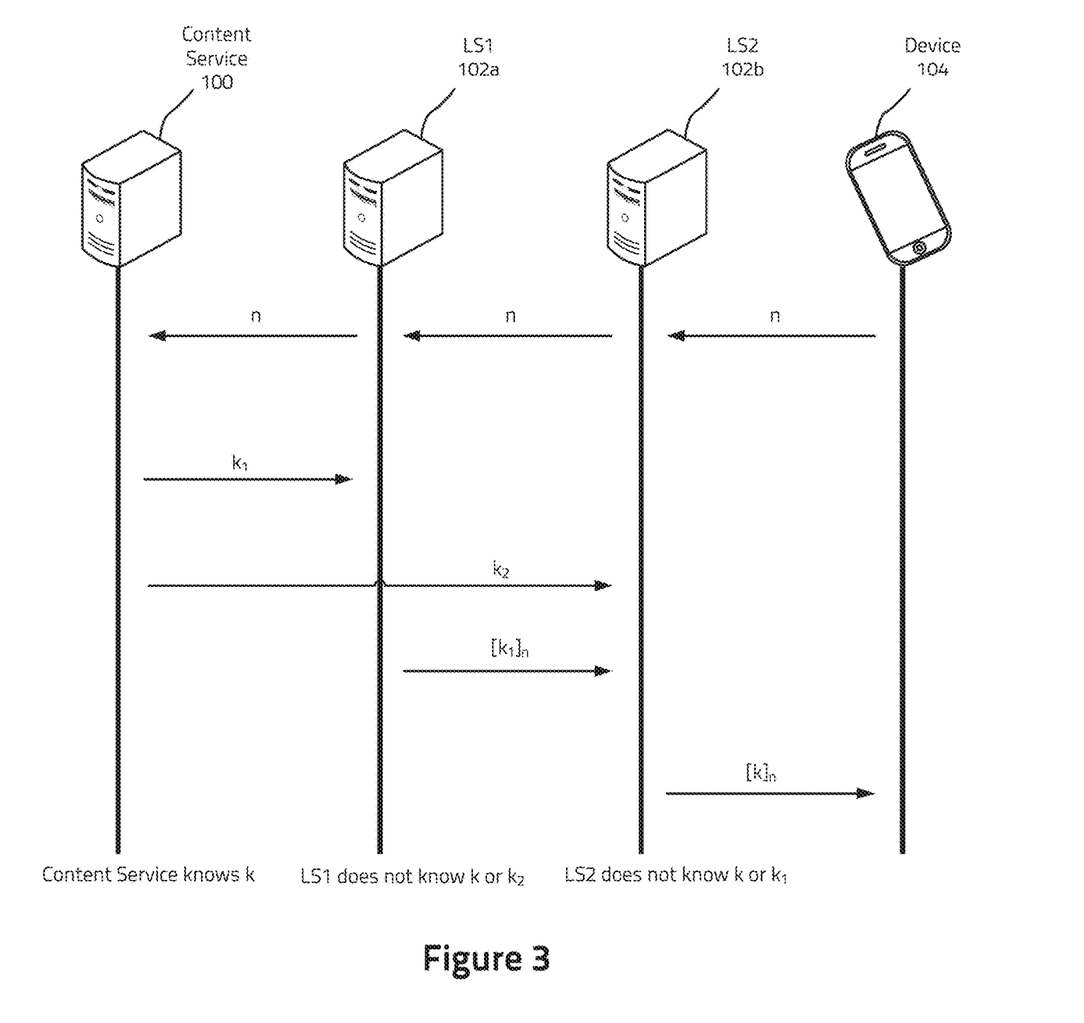
FIG. 3 illustrates a more detailed example of a content key distribution protocol using multiple content key shares involving a content service, multiple license services, and a rendering device consistent with certain embodiments disclosed herein.

FIG. 3 illustrates a more detailed example of a content key distribution protocol using multiple content key shares involving a content service 100, multiple license services LS1 102*a*, LS2 102*b*, and a rendering device 104 consistent with certain embodiments disclosed herein. Consistent with embodiments disclosed herein, the content service 100 may split a content key k that may be used to decrypt protected and/or otherwise encrypted electronic content into multiple key shares. The content service 100 may communicate the generated key shares to different license services 102*a*, 102*b*. For example, as illustrated, the content service 100 may send a first key share—$k_1$—of a content key k to a first license service 102*a*. Similarly, the content service may send a second key share—$k_2$—of the content key k to a second license service 102*b*. In various embodiments, the first and second key shares may be generated in a manner such that knowledge of either the first key share or the second key share alone does not reveal the unencrypted content key k.

The device 104 may share a device public key n with the content service 100 and/or license services 102*a*, 102*b*. As described above, the device public key may comprise a public key used in connection with an asymmetric cryptographic protocol such as, for example and without limitation, RSA and/or other associated protocols. In certain embodiments, the cryptographic protocol may use a homomorphic encryption function such as RSA.

In certain embodiments, the content key and/or content key shares $k_1$ and/or $k_2$ may be generated by the content service 100 (and/or a key share generation service associated with the content service) based, at least in part, on the device public key n shared by the device 104. For example and without limitation, the content service 100 may generate content key shares $k_1$ and/or $k_2$ that, when encrypted with the device public key n, may be multiplied to generate the content key k encrypted by the device public key n—that is $[k_1]_n \cdot [k_2]_n = [k]_n$. In some embodiments, the content key shares $k_1$ and/or $k_2$ may be generated using a factorization process applied to the content key k. In further embodiments, the content key k may be generated by the content service 100 by first generating content key shares $k_1$ and/or $k_2$ and identifying a content key k that, when encrypted by the device public key n, may be computed by multiplying the generated content key shares $k_1$ and/or $k_2$ encrypted by the device public key n—that is $[k_1]_n \cdot [k_2]_n = [k]_n$.

As shown in FIG. 3, the first license service 102*a* may encrypt the first content key share $k_1$ received from the content service 100 using the device public key n received from the device 104. The first license service 102*a* may communicate the encrypted first key share $[k_1]_n$ to the second license service 102*b*. The second license service 102*b* may encrypt the second key share $k_2$ received from the content service 100 using the device public key n.

Using the encrypted first key share $[k_1]_n$ received from the first license service 102*a* and the generated encrypted second key share $[k_2]_n$, the second license service 102*b* may generate the protected content key $[k]_n$ (e.g., the content key k encrypted by the device public key n) by multiplying the encrypted key shares—that is $[k_1]_n \cdot [k_2]_n = [k]_n$. In some embodiments, the second license service 102*b* may include the generated protected content key in a license associated with the protected content. The protected content key and/or an associated license may be distributed to the authorized device 104 and/or an associated user for use in connection with accessing, using, and/or otherwise rendering the protected electronic content. For example, in some embodiments, the device 104 may decrypt the protected content key using a private device decryption key corresponding to its public encryption key n, and use the decrypted content key to decrypt protected electronic content for access, use, and/or rendering by the device 104.

As discussed above, a homomorphic encryption cipher such as, for example and without limitation, unpadded RSA, may be used in connection with various disclosed embodiments. With a homomorphic encryption cipher, such as unpadded RSA, given two messages $m_1$ and $m_2$:

$$[m_1 \cdot m_2]_n = [m_1]_n \cdot [m_2]_n$$

In more detail, if e is the public key exponent (e.g., often e=65,537, although other suitable values may also be used), then:

$$(m_1 \cdot m_2)^e \bmod n = m_1^e \cdot m_2^e \bmod n$$

To split a content encryption key k into two content key shares $k_1$ and $k_2$, in some embodiments, the content service 100 may generate a message r for use in connection with generating the shares. In certain embodiments, the message r may comprise a random message. The content key shares $k_1$ and $k_2$ may be computed as:

$$k_1 = r \bmod n \text{ and } k_2 = k \cdot r^{-1} \bmod n$$

Splitting the content key into content key shares $k_1$ and $k_2$ in the above manner may result in content key shares $k_1$ and $k_2$ that, when encrypted with the device public key n, may be multiplied to generate the content key k encrypted by the device public key n—that is $[k_1]_n \cdot [k_2]_n = [k]_n$.

In the embodiments illustrated and described in connection with FIG. 3, the device 104 may share, either directly or indirectly via one or more suitable intermediaries which may include one or more of the license services 102a, 102b, its public key n with the content service 100. The content service may generate key shares $k_1$ and $k_2$ that depend, at least in part, on the device public key n. By extension, the content key k may also depend on the device public key n. In other words, the content key k may only be used by a device that possesses the private decryption key corresponding to the device's public key n. This may result in the content service 100 having to generate different device-specific content keys for different devices.

A content service 100 may wish to generate content keys k and/or associated content key shares that may not necessarily be specific to a particular device and/or associated device public key n. For example, a content service 100 may be interested in generating and distributing content keys that can be protected using a variety of different public keys.

In some asymmetric encryption techniques, including certain RSA encryption techniques, data may be padded prior to encryption. For example, consistent with embodiments disclosed herein, content keys may be transformed (e.g., padded) with padding data prior to encryption. A variety of padding algorithms may be used in connection with generating padding data including, for example and without limitation, RSA PKCS #1 v1.5 and/or Optimal Asymmetric Encryption Padding ("OAEP").

Figure 4:
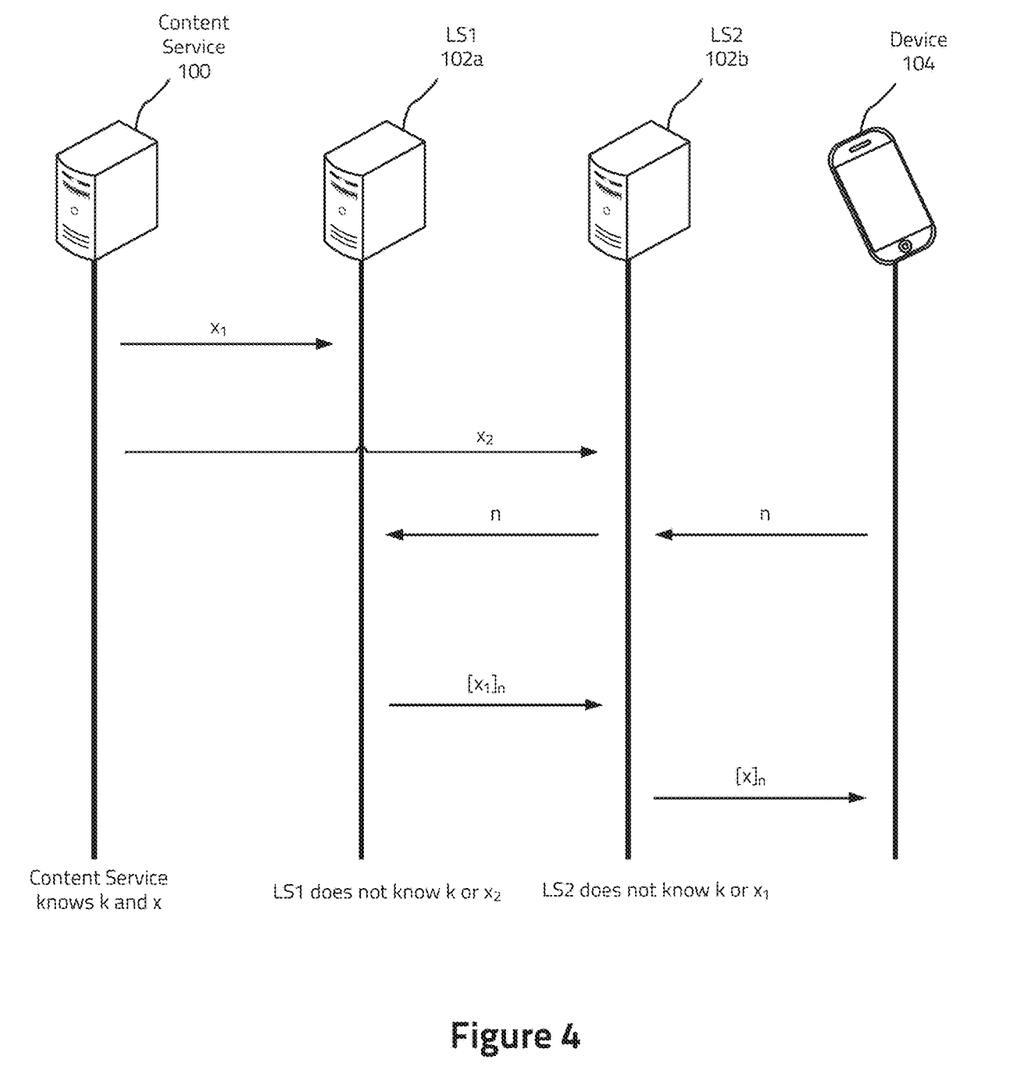
FIG. 4 illustrates an example of a content key distribution protocol using multiple content key shares and padding consistent with certain embodiments disclosed herein.

Consistent with various disclosed embodiments, padding techniques may be employed in connection with content key and/or content key share generation that may allow for the content service 100 to generate content keys and/or associated content shares that can be protected using a variety of different device public keys. Using padding techniques may further simplify content key and/or key share generation. FIG. 4 illustrates an example of a content key distribution protocol using multiple content key shares and padding consistent with certain embodiments disclosed herein.

RSA PKCS #1 v1.5 may provide certain flexibility in terms of the structure of generating padding data. Consistent with embodiments disclosed herein, this flexibility may be used to help simply the generation of content keys and/or content key shares.

As shown in FIG. 4, the rendering device 104 may share its device public key n with a first license service 102a and a second license service 102b. The content service 100 may generate a padded version of the content key k that, in certain instances herein, may be denoted as x. The padded content key x may be generated by applying a padding function as follows:

$$x = g(k)$$

where x is the padded content key, k is the content key, and g( ) is the padding function.

The device 104 may expect to receive (e.g., receive as part of a license to access content) the padded content key encrypted with the device public key n—that is $[g(k)]_n$ or $[x]_n$. Upon receipt of the encrypted padded content key, the device 104 may decrypt the padded content key using its private device key corresponding to the device public key n and extract the content key from the decrypted padded content key information.

As discussed above, a variety of padding functions (e.g., RSA padding functions) may be used in connection with the disclosed embodiments. For example and without limitation, in some embodiments, a RSA PKCS #1 v1.5 padding scheme may be used. A padded message using this scheme may have the form: 00 02 PS 00 k, where PS is the padding string. If the modulus n has length|n| bytes (e.g., |n|=256), and the content key payload k has |k| bytes (e.g., |k|=16), then in certain embodiments the padding string PS may have |n|-|k|-3 bytes (e.g., |PS|=237). In certain embodiments, the bytes of the padding string may be non-zero, but may otherwise be random and/or pseudorandom.

Consistent with embodiments disclosed herein, the content service 100 may generate a padding string PS that allows for factorization of a resulting padded content key x into padded content key shares $x_1$ and $x_2$. For example, for certain padding schemes (e.g., RSA a PKCS #1 v1.5), the content service 100 may find integers $x_1$ and $x_2$ of size |n|/2 so that $x_1 \cdot x_2 = x = g(k)$. Although various embodiments may use integers $x_1$ and $x_2$ of size |n|/2, will be appreciated that any suitable length of integers $x_1$ and $x_2$ may be employed, including integers of different lengths, so that $x_1 x_2 = x = g(k)$.

In some circumstances, the factorization of an integer of size |x| may be relatively expensive in terms of time and/or computational requirements. In various disclosed embodiments, a padding string PS may be selected that helps to reduce factorization time and/or computational requirements. In certain embodiments, the choice of the padding string PS may not necessarily be fixed, but in some embodiments may be random and/or pseudorandom.

If $x = x_1 \cdot x_2$ are integers, then for any device public key n:

$$x^e \bmod n = x_1^e \cdot x_2^e \bmod n$$

Consistent with various disclosed embodiments, methods used to factor $x = x_1 \cdot x_2$ by the content service 100 can be accomplished in stages, from right to left, starting with the least significant bits of $x_1$ and $x_2$. In certain embodiments, the scheme may restrict itself to using content keys k that are odd integers. That is, the scheme may force the least significant bit of generated content keys k to be one. Under this scheme, $x_1$ and $x_2$ may also be odd (e.g., their least significant bits may also be one).

In at least one non-limiting example, the content service 100 may initially fix the L least significant bits of $x_1$ and $x_2$ (L being greater than or equal to one), and the set L least significant bits of $x_1 \cdot x_2$ may agree with the L least significant bits of x. The content service 100 may define bit variables $b_1$ and $b_2$, where $b_1 = x_1 \bmod 2^L$ and $b_2 = x_2 \bmod 2^L$. The factorization method may select bits $a_1$ and $a_2$ so that the L+1 least significant bits of x agree with the L+1 least significant bits of:

$$(2^L a_1 + b_1)(2^L a_2 + b_2) = 2^{2L} a_1 a_2 + 2^L (a_1 b_2 + a_2 b_1) + b_1 b_2$$

If $b_1 b_2 = x \mod 2^{L+1}$ the method may take $a_1 = a_2 = 0$ or $a_1 = a_2 = 1$. If $b_1 b_2 \neq x \mod 2^{L+1}$ then $a_1 = 0, a_2 = 1$ or $a_1 = 1, a_2 = 0$. The method may proceed in this matter until L=|k|+8. At this stage, the method may continue and attempt to establish:

$$x_1 \cdot x_2 = 0002(PS)00(k)$$

The method may select the most significant bytes of $x_1$ and $x_2$ to be 01. The remaining bytes of $x_1$ and $x_2$ may be chosen repeatedly at random, until the padding string has no zero bytes and the first two bytes of x are 00 02. In some circumstances, this may occur with a few random trials.

In some embodiments, an adjustment may be made to the aforementioned methods if the padded content key x is not necessarily an odd integer (e.g., even)—that is, if a padded content key x ends in m zero bits, where m>=0. In the case where m=0 and the padded content key x is therefore an odd integer, the initial values of $x_1$ and $x_2$ in binary may be 0b1 and 0b1. If m=1, $x_1$ may initialize as 0b10 and $x_2$ may initialize as 0b1. If m=2, $x_1$ may initialize as 0b10 and $x_2$ may initialize as 0b10. In connection with the factorization process, for all m>=0, the m zero bits may be split between $x_1$ and $x_2$. Then the lower m+1 bits of x may agree with those of $x_1 \cdot x_2$.

In various embodiments, the goal of the methods described above may be for the content service 100 to generate randomized shares of $x_1$ and $x_2$ so that $x_1 \cdot x_2 = x = g(k)$. The method may generate random candidate paddings of $x = g(k)$, possibly in parallel, and may start attempting to factor $x = x_1 \cdot x_2$, where $x_1$ and $x_2$ have approximately similar and/or equal lengths, although it will be appreciated that in further embodiments $x_1$ and $x_2$ may have different lengths. In certain embodiments, integer factoring algorithms may run a relatively long time. If a particular padded content key x resists factorization within some time t, the padded content key x may be discarded, and a new padded content key $x' = g(k)$ may be generated. This may proceed until a suitable factorization $g(k) = x = x_1 \cdot x_2$ is found by the content service 100.

Once padded content key shares $x_1$ and $x_2$ have been generated, the content service 100 may communicate the padded content key shares to different license services 102a, 102b. For example, as illustrated in FIG. 4, the content service 100 may send a first padded content key share $x_1$ to the first license service 102a. Similarly, the content service 100 may send a second padded content key share $x_2$ to the second license service 102b. Knowledge of either the first padded content key share $x_1$ or the second padded content key share $x_2$ alone may not reveal the unencrypted padded content key x. As described above, the padded key shares $x_1$ and $x_2$, when encrypted with the device public key n, may be multiplied to generate the padded content key x encrypted by the device public key n—that is $[x_1]_n \cdot [x_2]_n = [x]_n$.

The device 104 may share a device public key n with the license services 102a, 102b. As described above, the device public key may comprise a public key used in connection with an asymmetric cryptographic protocol such as, for example and without limitation, RSA and/or other associated protocols. In certain embodiments, the cryptographic protocol may use a homomorphic encryption function such as RSA.

As shown in FIG. 4, the first license service 102a may encrypt the first padded content key share $x_1$ received from the content service 100 using the device public key n received from the device 104. The first license service 102a may communicate the encrypted first padded content share $[x_1]_n$ to the second license service 102b. The second license service 102b may encrypt the second key share $x_2$ received from the content service 100 using the device public key n.

Using the encrypted first key share $[x_1]_n$ received from the first license service 102a and the generated encrypted second key share $[x_2]_n$, the second license service 102b may generate the protected padded content key $[x]_n$ (e.g., the padded content key x encrypted by the device public key n) by multiplying the encrypted padded key shares—that is $[x_1]_n \cdot [x_2]_n = [x]_n$. In some embodiments, the second license service 102b may include the generated protected padded content key $[x]_n$ in a license associated with the protected content. The protected content key and/or an associated license may be distributed to the authorized device 104 and/or an associated user for use in connection with accessing, using, and/or otherwise rendering the protected electronic content. For example, in some embodiments, the device 104 may decrypt the protected padded content key using a private device decryption key corresponding to its public encryption key n, extract the content key k from the decrypted padded content key, and use the content key k to decrypt protected electronic content for access, use, and/or rendering by the device 104.

In various embodiments, this technique may be generalized for some number of license services s, such that $2 \leq s \leq |n|/|k|$. Moreover, although various embodiments described above use RSA PKCS #1 v1.5 as padding scheme, it will be appreciated that various principles and/or aspects of the disclosed embodiments may be used in connection with other padding schemes including, for example and without limitation, OAEP schemes.

In various embodiments and examples described herein where multiple license services are used (e.g., LS1 and LS2), a license service may receive encrypted key shares from one or more other license services, generate an encrypted key share based on its key share received from the content service, and generate a protected content key based on the received encryption key shares and the generated encrypted key share for distribution to the device. For example, as illustrated in FIG. 4, the second license service 102b may generate an encrypted second key share $[x_2]_n$ using the second key share received from the content service 100 and the device public key n, and may generate the protected padded content key $[x]_n$ for distribution to the device 104 by multiplying the generated encrypted second key share $[x_2]_n$ by an encrypted first key share $[x_1]_n$ received from the first license service 102a—that is $[x_1]_n \cdot [x_2]_n = [x]_n$. In further embodiments, the device 100 itself may generate the protected padded content key $[x]_n$ based on encrypted key share information provided by one or more license services (e.g., license services 102a, 102b). For example, in some embodiments, the first license service 102a may share the encrypted first key share $[x_1]_n$ with the device 100, and the second license service 102b may share the encrypted second key share $[x_2]_n$ with the device 100. Based on the received encrypted key shares $[x_1]_n$ and $[x_2]_n$, the device 100 may generate the protected padded content key $[x]_n$ by multiplying the received encrypted padded key shares—that is $[x_1]_n \cdot [x_2]_n = [x]_n$.

In various embodiments, key shares and/or padded key shares transmitted from the content service to one or more license services may be associated with key identification information that may allow receiving license services and/or devices to identify that received key shares and/or padded key shares are associated with other key shares and/or padded key shares. In addition, a protected key share and/or padded key share generated by a license service shared with another license service and/or a device may also include key identification information that may allow the receiving service and/or device to identify that the received protected key share and/or padded key share is associated with other protected key shares and/or padded key shares.

For example, referring to FIG. 4, the content service 100 may communicate key identification information associated with $x_1$ to the first license service 102a and key identification information associated with $x_2$ to the second license service 102b. The key information associated with $x_1$ and $x_2$ may be used to identify that $x_1$ and $x_2$ are shares associated with the same padded content key. The first license service 102a may associate key identification information with $[x_1]_n$ and transmit the key identification information along with $[x_1]_n$ to the second license service 102b. Using the key identification information associated with its received padded key share $x_2$ and key identification information associated with the protected padded key share $[x_1]_n$ received from the first license service 102a, the second license service 102b may determine that $x_2$ and $[x_1]_n$ are both associated with the same padded content key and may use the this determined relationship to generate the protected padded content key $[x]_n$.

In embodiments where key shares are generated based on a specific device public key n, such as, for example, various embodiments illustrated in and described in connection with FIG. 3, key identification information may allow for the key shares to be identified by receiving license services and/or devices as being associated with the particular device public key n used to generate the key shares.

Figure 5:
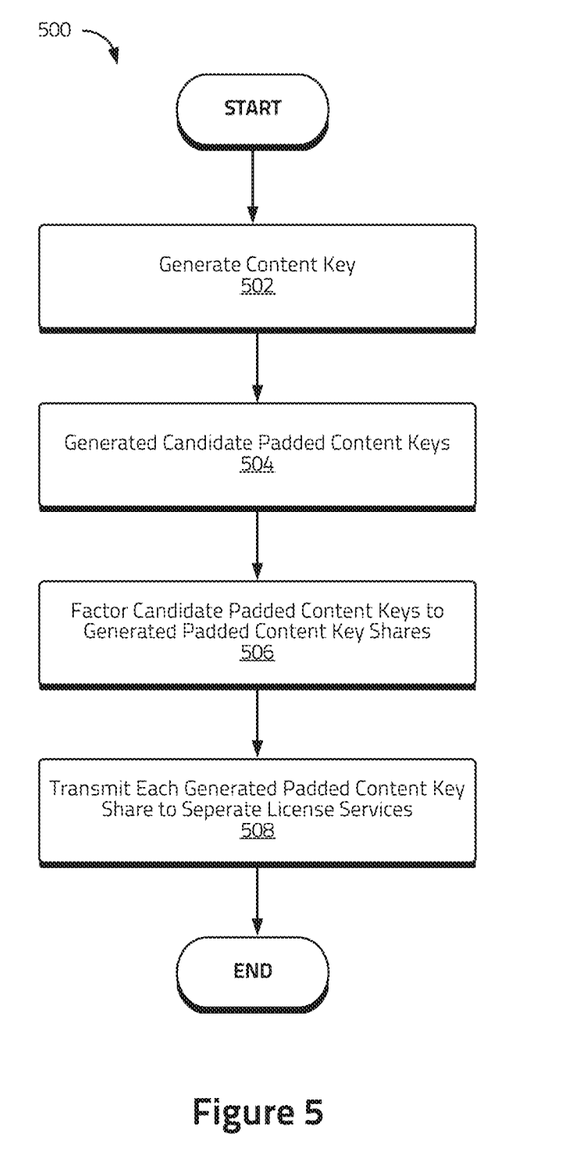
FIG. 5 illustrates a flow chart of an example of a method of generating padded content key shares consistent with certain embodiments disclosed herein.

FIG. 5 illustrates a flow chart of an example of a method 500 of generating content key shares consistent with certain embodiments disclosed herein. The illustrated method 500 and/or aspects thereof may be performed by and/or in conjunction with software, hardware, firmware, and/or any combination thereof. In various embodiments, the method 500 may be performed by a content service for use in connection with generating padded content key shares for distribution to a plurality of license services.

At 502, the content service may generate a content key. In various embodiments, the content key may be used to decrypt a piece of protected electronic content. In some embodiments, the protected electronic content may comprise electronic content encrypted with the content key and/or another associated key that may be decrypted using the content key and/or another decryption key derived therefrom.

At 504, one or more candidate padded content keys may be generated. In certain embodiments, the candidate padded content keys may comprise the content key generated at 502 with included padding data. In some embodiments, the padding data may be appended to the content key k to generate the candidate padded content keys. For example, using a RSA PKCS #1 v1.5 padding scheme, a padding string PS and one or more other set bytes may be appended to a content key k to generate a candidate padded content string (e.g., resulting in a padded content key of the form 00 02 PS 00 k), although other suitable padding schemes are also envisioned.

The content service may attempt to factor the one or more candidate padded content keys generated at 504 into a plurality of padded content key shares at 506. In some embodiments, this factorization process may involve the various factorization steps and/or associated methods detailed above in reference to FIG. 3 in connection with the generation of candidate key shares.

At 508, each of the generated padded content key shares may be transmitted to a separate license service of a plurality of license services operating to generate protected padded content keys and/or associated licenses on behalf of the content service. For example and without limitation, in an implementation using where a padded content key is split into two padded content key shares, a generated first padded content key share may be transmitted from the content service to a first license service and a generated second padded content key share may be transmitted from the content service to a second license service. Consistent with various aspects of the disclosed embodiments, the license services may use the received padded content key shares to generate a protected padded content key (e.g., the padded content key encrypted using a device public key shared with the license services by a rendering device) and deliver the protected padded content key and/or a license including the same to the rendering device.

In various examples and/or embodiments described above, protected content key shares—$[k_1]_n$ and $[k_2]_n$—and/or protected padded content key shares—$[x_1]_n$ and $[x_2]_n$—may comprise multipliable key shares. That is, the protected content key shares may be multiplied by a license service (or in certain other embodiments a device itself) to generate a protected content key $[k]_n$ and/or the protected content key shares may be multiplied by a license service (or in certain other embodiments a device itself) to generate a protected padded content key $[x]_n$.

Figure 6:
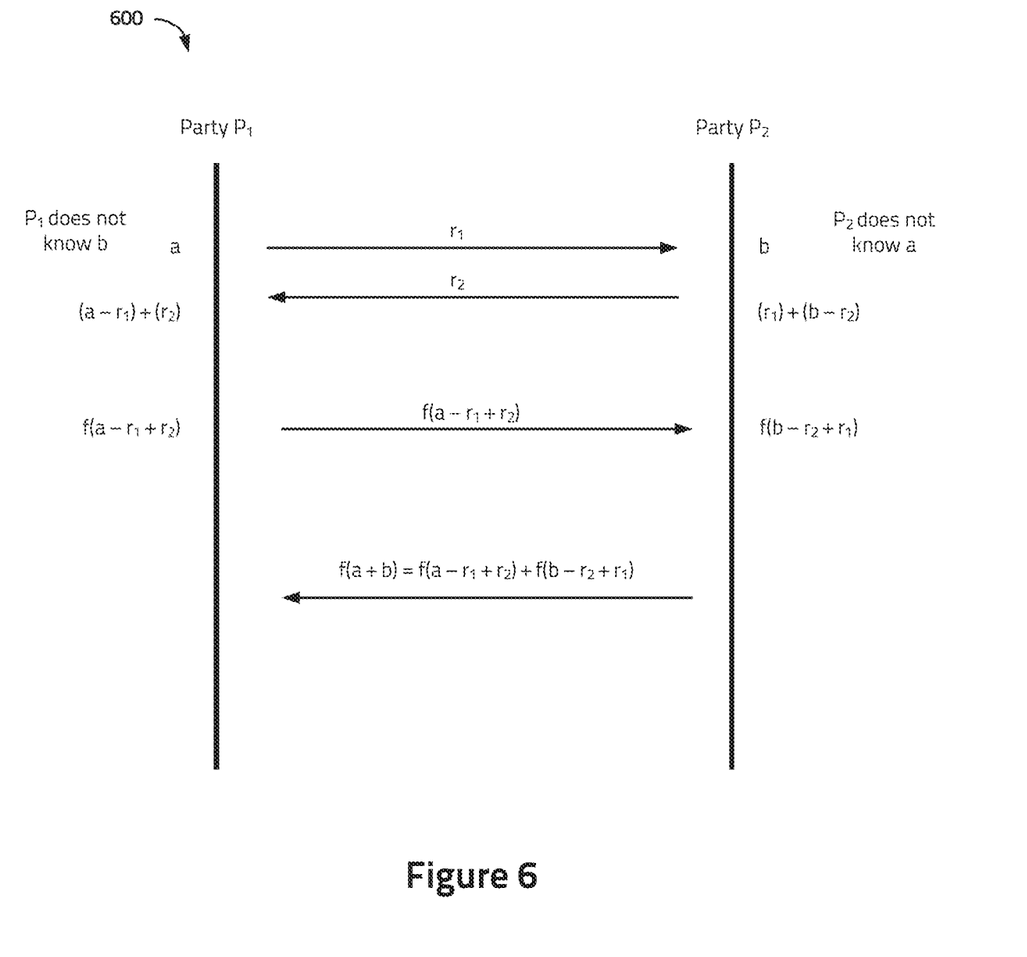
FIG. 6 illustrates a conceptual diagram of an example of a multi-party computation method using an additive function consistent with certain embodiments disclosed herein.

FIG. 6 illustrates a conceptual diagram of an example of an MPC method 600 using an additive function consistent with certain embodiments disclosed herein. In certain embodiments, the MPC method 600 may comprise a Goldwassen, Micali, and Wigderson ("GMW") method that may be based on additive shares. In the illustrated method 600, two parties $P_1$ and $P_2$, that in connection with the disclosed embodiments may comprise separate license services, may hold secret inputs a and b. In connection with various disclosed embodiments, these secret inputs may comprise different content key shares $k_1$ and $k_2$ and/or padded content key shares $x_1$ and $x_2$ as described above.

The two parties $P_1$ and $P_2$ may wish to compute a value c based on secret inputs a and b using a function f—that is, $c=f(a,b)$. In some embodiments, function f may comprise a one-way function. For example, function f may operate such that knowing the result c of the function does not reveal the inputs to the function a or b.

The GMW method 600 may start by establishing the shares of secret inputs a and b. For example, as shown, party $P_1$ may hold secret input share a and party $P_2$ may hold secret input share b. Party $P_1$ may not have knowledge, however, of secret input share b. Similarly, party $P_2$ may not have knowledge of secret input share a.

Parties $P_1$ and $P_2$ may generate and exchange random numbers—$r_1$ and $r_2$—used in connection with the method 600. For example, as shown, party $P_1$ may generate and transmit $r_1$ to party $P_2$, and party $P_2$ may generate and transmit $r_2$ to party $P_1$. In the computation, party $P_1$'s share of a and b may be $a_1=a-r_1$ and $b_1=r_2$, and party $P_2$'s share of a and b may be $a_2=r_1$ and $b_2=b-r_2$, where $a_1+a_2=a$ and $b_1+b_2=b$.

Party $P_1$ may compute the result of a function f based on its share of a and b—that is $f(a-r_1+r_2)$. The result computed by party $P_1$ may be communicated to party $P_2$. Party $P_2$ may compute the result of a function f based on its share of a and b—that is $f(b-r_2+r_1)$. Using the result communicated from party $P_1$ and the result computed by party $P_2$, party $P_2$ may compute the result of the function f based the additive combination of secret inputs a and b by: $f(a+b)=f(a-r_1+r_2)+f(b-r_1+r_2)$.

In certain embodiments, the function f may comprise an encryption function (e.g., encryption by a device public key n). The above method 600 may thus be applied in connection with computing a protected padded content key $[x]_n$ using associated additive padded content key shares $x_1$ and $x_2$, where $[x]_n=[x_1+x_2]_n=[x_1-r_1+r_2]_n+[x_2-r_1+r_2]_n$.

In some embodiments, the GMW protocol may express the one-way function f as a cascade of two kinds of input "gates," performing either an addition (XOR) x=y or a multiplication (AND) x·y of bits.

Although not specifically illustrated in connection with FIG. 6, if party $P_1$ and $P_2$ have shares of $u_1, u_2, y_1$, and $y_2$ of secret inputs u and y, they may form shares of z=u+y by computing separately $z_1=u_1+y_1$ and $z_2=u_2+y_2$. Computing shares of z=u·y may involve party $P_1$ and party $P_2$ engaging in an "oblivious transfer" protocol as part of a GMW method. The difference may be due, at least in part, to the shares being additive ($a=a_1+a_2$), as well as the addition function f(u,y)=u+y being additively homomorphic—i.e., $f(u_1+u_2, y_1+y_2)=f(u_1+y_1)+f(u_2+y_2)$.

Figure 7:
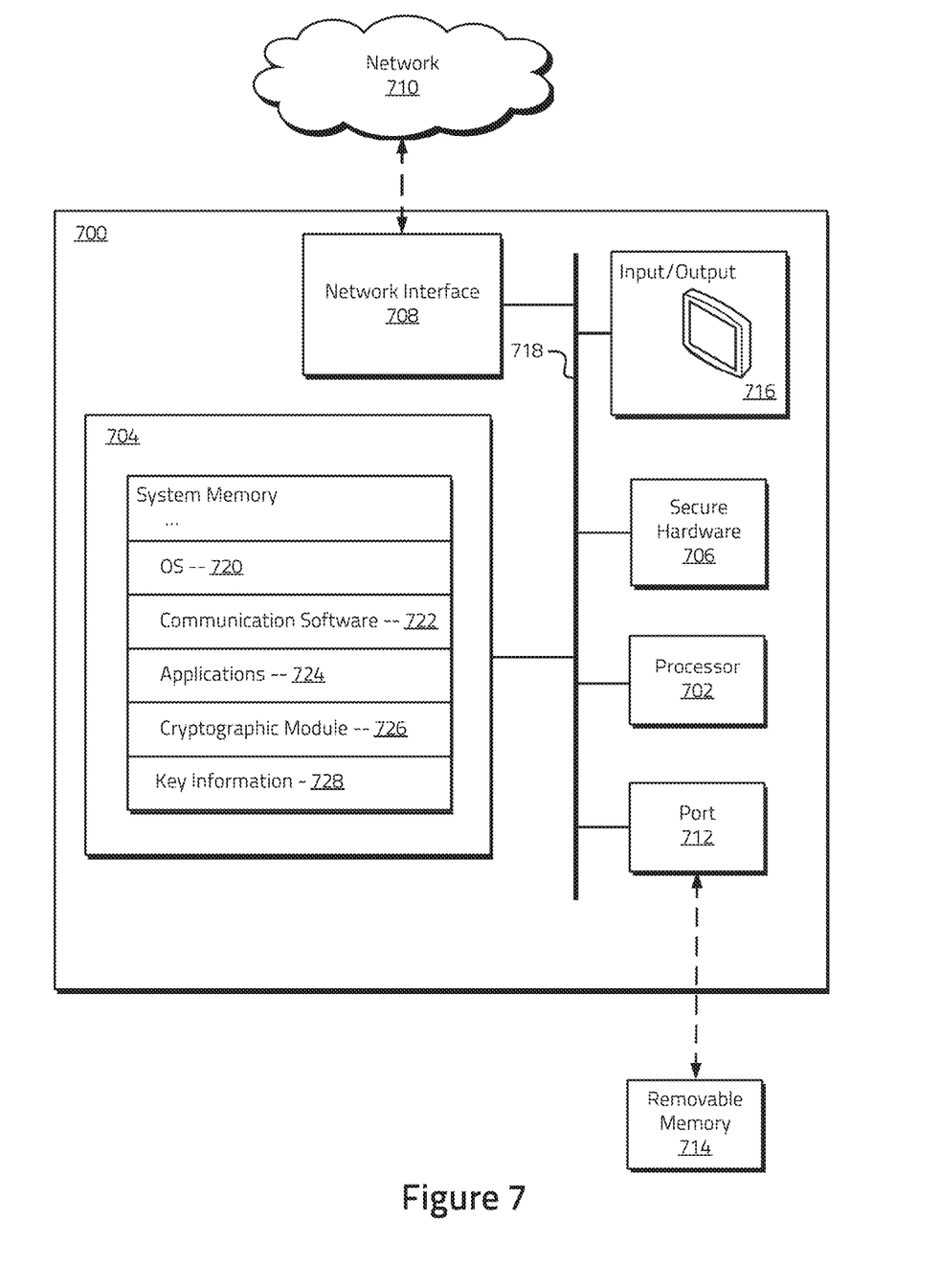
FIG. 7 illustrates an example of a system that may be used to implement aspects of the disclosed systems and methods consistent with certain embodiments disclosed herein.

FIG. 7 illustrates a system 700 that may be used to implement certain embodiments of the systems and methods of the present disclosure. In certain embodiments, elements of the illustrated system 700 may be included in and/or otherwise be associated with a content service, a license service, a rendering device, and/or any other associated party, device, system, and/or service used in connection with the disclosed embodiments.

As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 712 for interfacing with removable memory 714 that may include one or more diskettes, optical storage mediums (e.g., flash memory, thumb drives, USB dongles, compact discs, DVDs, etc.) and/or other non-transitory computer-readable storage mediums; a network interface 708 for communicating with other systems via one or more network connections 710 using one or more communication technologies; a user interface 716 that may include a display and/or one or more input/output devices such as, for example, a touchscreen, a keyboard, a mouse, a track pad, and the like; and one or more busses 718 for communicatively coupling the elements of the system 700.

In some embodiments, the system 700 may, alternatively or in addition, include secure hardware 706 such as, for example and without limitation, an SPU and/or a TEE, that is protected from tampering by a user of the system 700 or other entities by utilizing secure physical and/or virtual security techniques. For example, an SPU can help enhance the security of sensitive operations such as personal information management, trusted credential and/or key management, privacy and policy management, and other aspects of the systems and methods disclosed herein. In certain embodiments, the SPU may operate in a logically secure processing domain and be configured to protect and operate on secret information, as described herein. In some embodiments, the SPU may include internal memory storing executable instructions or programs configured to enable the SPU to perform secure operations, as described herein.

The operation of the system 700 may be generally controlled by a processing unit 702 and/or an SPU operating by executing software instructions and programs stored in the system memory 704 (and/or other computer-readable media, such as removable memory 714). The system memory 704 may store a variety of executable programs or modules for controlling the operation of the system 700. For example, the system 700 memory may include an operating system ("OS") 720 that may manage and coordinate, at least in part, system hardware resources and provide for common services for execution of various applications (e.g., applications 724) and/or a trust and privacy management system for implementing trust and privacy management functionality including protection and/or management of personal data through management and/or enforcement of associated policies. The system memory 700 may further include, without limitation, communication software 722 configured to enable in part communication with and by the system 700, applications 724, one or more cryptographic modules 726 configured to perform various aspects of the disclosed embodiments (e.g., cryptographic key operations, hashing operations, etc.), key and/or license information 728, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It is noted that there are many alternative ways of implementing both the systems and methods described herein. Accordingly, the disclosed embodiments are to be considered as illustrative and not restrictive, and the invention is not to be limited to the details given herein, but may be modified within the scope and equivalents of the appended claims.

What is claimed is:

1. A method for managing electronic data performed by a first service system comprising a processor and a non-transitory computer-readable medium storing instructions that, when executed by the processor, cause the first service system to perform the method, the method comprising:
   receiving a public key from a device;
   receiving a first padded decryption key share of a decryption key and first key identification information associated with the first padded decryption key share from a data management service managing the electronic data, the first padded decryption key share comprising a first padding string, the first key identification information identifying that the first padded key share is associated with the decryption key;
   receiving a protected second padded decryption key share of the decryption key and second key identification information associated with the protected second padded decryption key share from a second service, the protected second padded decryption key share comprising a second padded decryption key share of the decryption key encrypted by the second service using the public key, the second padded decryption key share comprising a second padding string, the second key identification information identifying that the second padded key share is associated with the decryption key;
   generating a protected first padded decryption key share of the decryption key by encrypting the first padded decryption key share using the public key;
   determining that both the first padded decryption key share and the second padded decryption key share are associated with the decryption key based on determining that the first key identification information and the second key identification information match;
   generating, at least in part responsive to the determining, a protected decryption key by multiplying the protected first padded decryption key share and the protected second padded decryption key share, the generated protected decryption key comprising the decryption key encrypted with the public key, wherein the first padding string and the second padding string being configured to allow for generation of the protected decryption key by the first service system without decrypting the protected first padded decryption key share and the protected second padded decryption key share; and
   transmitting the protected decryption key to the device for use in accessing the electronic data through the device decrypting the protected decryption key using a private key corresponding to the public key.

2. The method of claim 1, wherein the method further comprises receiving a request from the device for a license to access the electronic data.

3. The method of claim 2, wherein the method further comprises generating an electronic license for the electronic data, the electronic license comprising the protected decryption key.

4. The method of claim 3, wherein transmitting the protected decryption key to the device comprises transmitting the electronic license to the device.

5. The method of claim 1, wherein the first service is separate from the second service.

6. The method of claim 1, wherein the decryption key is generated by the data management service.

7. The method of claim 1, wherein the first padded decryption key share is generated by the data management service.

8. The method of claim 1, wherein the second padded decryption key share is generated by the data management service.

9. The method of claim 1, wherein the first service system is an untrusted system with respect to the data management service.

10. The method of claim 1, wherein the second service system is an untrusted system with respect to the data management service.

11. The method of claim 1, wherein the protected decryption key comprises the decryption key encrypted with the public key using a homomorphic encryption algorithm.

12. The method of claim 1, wherein the protected second padded decryption key share comprises the second padded decryption key share encrypted with the public key using a homomorphic encryption algorithm by the second service system.

13. The method of claim 1, wherein the protected first padded decryption key share comprises the first padded decryption key share encrypted with the public key using a homomorphic encryption algorithm.

14. The method of claim 1, wherein the protected decryption key comprises a protected padded decryption key.

15. The method of claim 1, wherein the public key is associated with the device.

16. The method of claim 1, wherein the public key is associated with a user of the device.

17. The method of claim 1, wherein the private key is associated with the device.

18. The method of claim 1, wherein the private key is associated with a user of the device.

* * * * *